United States Patent

[11] 3,545,663

[72] Inventor Walter J. Bloemhard
  Hicksville, New York
[21] Appl. No. 701,298
[22] Filed Jan. 29, 1968
[45] Patented Dec. 8, 1970
[73] Assignee Columbia Gas System Service Corporation
  New York, New York
  a corporation of Delaware

[54] OFF-SHORE WELDING STATION
  4 Claims, 3 Drawing Figs.
[52] U.S. Cl. .................................................. 228/6,
  29/493; 61/72.3; 228/29; 228/44, 285/286
[51] Int. Cl. ...................................................... B23k 1/00,
  B23k 5/00
[50] Field of Search ........................................... 228/4, 6,
  29, 44; 61/72.3

[56] References Cited
UNITED STATES PATENTS

| | | | |
|---|---|---|---|
| 3,431,739 | 3/1969 | Richardson et al. | 61/72.3 |
| 3,440,826 | 4/1969 | Kline | 61/72.3 |

FOREIGN PATENTS

| | | | |
|---|---|---|---|
| 661,070 | 3/1964 | Italy | 61/72.3 |
| 441,135 | 7/1967 | Switzerland | 61/72.3 |

OTHER REFERENCES

Larry Resen, "New Pipe-Launching Device Lowers". Oil and Gas Journal, Nov. 4, 1957, pp. 154—155

"New Pipe-Laying Barge Goes to Work", Oil and Gas Journal, May 26, 1958 pp. 60—61

*Primary Examiner*—John F. Campbell
*Assistant Examiner*—Ronald J. Shore
*Attorney*—Curtis, Morris and Safford

ABSTRACT: An apparatus and method are disclosed for welding pipe sections in offshore pipeline systems wherein a welding platform is provided on a barge. The barge is provided with davits and sliding carriages which grasp and lift the pipe sections from the water and places the pipe ends in position to be welded on the barge. After the welding operation has been completed the pipe is moved from the barge into the water.

PATENTED DEC 8 1970

3,545,663

INVENTOR.
Walter J. Bloemhard
BY
Curtis, Morris & Safford
ATTORNEYS

OFF-SHORE WELDING STATION

The present invention relates to a method and apparatus for welding pipe sections, and more in particular to a method and apparatus for welding pipe sections at the surface of a body of water to form a continuous offshore pipeline.

At the present time, there is ever increasing activity in offshore well drilling operations for which extensive supporting underwater pipeline systems are needed. These offshore drilling operations are now being carried out at widely dispersed locations and at great distances from the shore, thus necessitating a need for large scale and diverse pipeline systems to deliver the petroleum and gas products to the shore. In the past, such pipe laying operations have been carried out from lay barges wherein forty foot sections of pipe are each in turn welded to previously prepared pipeline, weight coated with a corrosive resistant coating and then laid from the rear of the lay barge from a "stinger." This is inherently a slow, tedious and expensive process as each of the forty foot sections must be first transported out to the welding barge, loaded onto the barge, individually welded to the preceding section and coated.

It is therefore an object of this invention to provide a simple and economically feasible method and apparatus for welding pipe sections for use in offshore pipeline systems. Another object is to provide an improved method and apparatus for welding pipeline sections for use in offshore pipeline systems in a more rapid manner. It is a further object to provide an improved welding station for long strings of pipeline at an offshore location. These and other objects and advantages of the present invention will be in part obvious and in part pointed out below.

Figure 1:
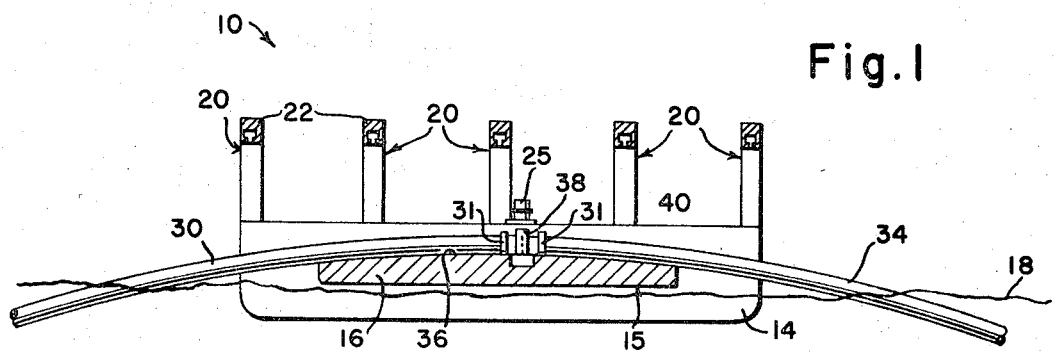
FIG. 1 is a somewhat schematic vertical section showing a welding station which constitutes one embodiment of the present invention.
Figure 2:
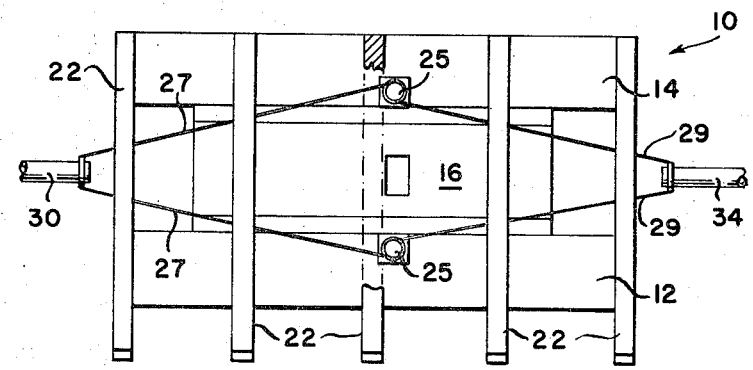
FIG. 2 is a top plan view of the embodiment of FIG. 1 showing the manner in which the pipeline sections are positioned on the barge.
Figure 3:
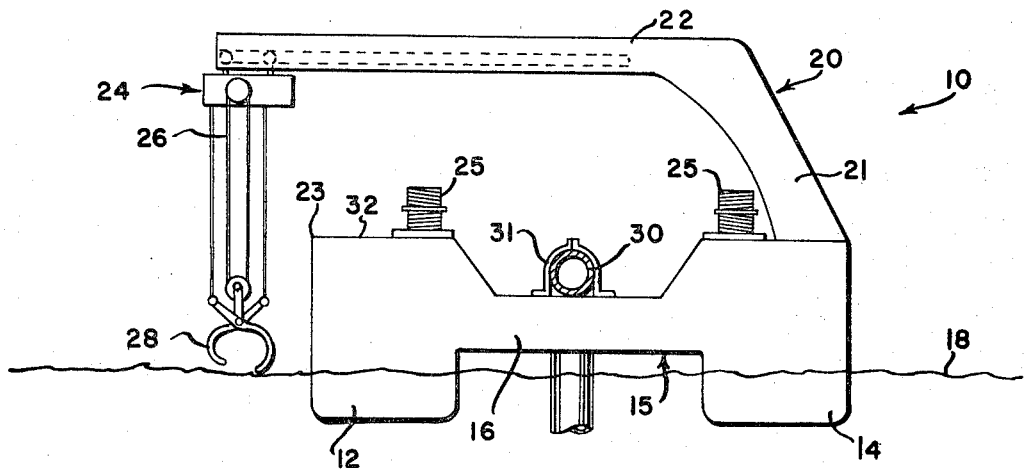
FIG. 3 is a vertical end view showing the apparatus of FIG. 1.

Referring to the drawings, there is shown a welding barge 10 which is of the catamaran type and includes twin hulls 12 and 14, respectively, and an interconnecting center deck 16. Hulls 12 and 14 buoyantly support the barge so that normally portion 15 at the center deck 16 is above the water surface level 18.

The barge includes a plurality of davits 20 which are mounted on hull 14 and are spaced along the length of the barge. Each of the davits 20 is generally L-shaped with an upright portion 21 and a long horizontal leg 22 positioned parallel to and spaced from the barge deck. The free end of leg 22 extends beyond the deck edge 23 at the side of hull 12 so that a portion of the leg is over the water. Mounted upon each davit is a hoist and carriage assembly 24 which is adapted to move along leg 22 of the davit between a first position over the water and a second position at the center deck 16. Each hoist and carriage assembly 24 includes a pulley system 26 powered by a winch (not shown) and a pipe clamp 28 which can be opened and closed.

A pair of winches 25 are mounted on each hull 12 and 14 near the midportion of the barge. The winches are double acting so that they can be powered to drag a pipeline section from the water to the barge from each end of the barge. When it is desired to position a section of pipeline 30 on the barge deck 16, lines 27 from each winch 25 are attached to the free end of pipeline section 30 and the winches activated to pull the pipeline section up to the barge level and drag it up the curved center deck to the welding station. Similarly, pipeline section 34, is located by lines 29 from each winch 25 in close abutting relation to the free end of pipeline section 30. The two sections are then secured to the deck 16 by clamps 31, which secure the pipe sections in a manner to preclude shifting and moving.

Referring now particularly to FIG. 1, the top surface 36 of center deck section 16 is curved slightly such that the center portion of the deck is at a higher elevation than either of the ends. A circumferential pipe welding apparatus 38 is positioned off center along the downwardly inclined surface 40 of the deck. Thus, when the two pipe sections, 30 and 34, to be welded are placed in position, they form a substantially linear profile along a tangent to the radius of curvature of center deck 16.

After the welding operation has been completed, the hoist and carriage assembly 24 is positioned over the welded pipeline section and pulley system 26 is operated to lower clamp 28 and the clamp jaws are opened and then closed so as to grasp the pipeline section. Clamps 31 are then released and the pulley system raises the pipeline section to a level above the deck 32 of hull 12. Assembly 24 is then moved outwardly along legs 22 of davits 20 to a position over the water and the pulley system is again operated to lower the welded pipeline section to the water where clamps 28 are opened to allow the pipeline section to settle in the water.

The catamaran weld barge forms a uniquely stable welding platform which can be used to weld pipeline sections of substantial length. The apparatus of the present invention can be used, as an alternative means of connection, to weld pipe strings constructed according to the method disclosed in copending application Ser. No. 669,220, filed Sept. 20, 1967, now U.S. Pat. No. 3,479,831, which application is incorporated herein by reference. In that copending application a method of preparing long pipe strings is disclosed wherein long strings of pipeline are welded at a shore installation and the buoyancy of the string is controlled to maintain a slight positive buoyancy. The buoyant string is then floated to the desired installation area to be installed. Pipe strings prepared by this method can be welded at the installation area by the catamaran weld barge. In this manner, the tedious step-by-step welding process is obviated. Further, since the major portion of the pipe string is welded at a shore installation, the number of welds at sea is greatly reduced allowing for more rapid pipe laying operation which minimizes assembly costs.

The catamaran barge itself presents a very stable floating platform that is less effected by adverse sea conditions than the commonly used flat bottom barge. The contoured center deck provides a unique stabilized platform permitting the welding of long lengths of pipeline which have substantial portions of their length extending into the water and thus subject to buffeting from wave and current action. By draping the pipeline sections over the curved center deck, much of the bobbing action to which the barge will be subjected is absorbed by the inherent resiliency of the pipeline portion extending beyond the barge and is not transmitted to the free ends that are to be welded. Further, since the welding platform is contoured and the pipeline sections are draped over the contour so as to assume a contoured profile themselves, a horizontal force component imparted to the pipeline section will have a resultant component perpendicular to the platform which will tend to resist any lateral shifting of the pipeline. Thus, when the respective pipe lengths are in position to be welded, they are clamped to the center deck and any resulting bobbing action to which the barge is subject will not affect the stabilized ends of the pipelines. In this manner, the two ends, now abutting, can be circumferentially welded by the welding apparatus 38 and after the weld is completed, the pipeline is released, lifted free of the barge, and deposited back into the water. The barge can now move along the length of pipe, retrieve the pipe from a submerged or floating position and weld it to a new length that has been floated out to, or is laying submerged at the installation area.

I claim:

1. An apparatus for welding pipe sections for use in offshore pipeline systems comprising:

a floating, stable welding platform;

means associated with said platform for retrieving pipe sections to be welded from a submerged position removed from said platform, and to return welded pipe sections to the water;

means for positioning said pipe sections on said welding platform in end-to-end abutting relationship;

means on said platform for welding said abutting pipe sections together;

said platform including a deck portion contoured such that the midportion thereof has a higher elevation than either of its ends to provide a radiused support for said pipe sections to be welded; and and said welding means being positioned on said deck portion at a point below the highest elevation of said deck portion wherein when said pipe sections are placed in abutting end-to-end relationship on said deck portion said pipe sections assume a contour similar to the contour of said deck portion whereby a horizontal face component placed on said pipe strings because of the bobbing action of the floating platform in water will have a resultant force component perpendicular to the platform thereby to resist lateral movement of said pipeline sections while they are welded.

2. Apparatus as defined in claim 1 wherein said platform comprises a catamaran barge including at least a pair of buoyant hulls and said contoured deck portion interconnects said hulls.

3. Apparatus as defined in claim 1 wherein said platform is a catamaran barge and said means for retrieving pipe sections to be welded and to return welded pipe sections to the water comprise a plurality of generally L-shaped davits spaced along the length of said barge, each of said davits including a carriage assembly adapted for reciprocating movement along a leg of said davit, and each of said carriages including extensible pulley means and clamp means for grasping and elevating said pipe sections from said platform.

4. The apparatus of claim 3 wherein each of said davits include a leg portion spaced from and extending parallel to the deck of said barge, the end of said leg extending beyond the edge of said barge and said carriage assembly is adapted for reciprocable motion from a first position over said platform to a second position adjacent said end whereby said pipe sections are retrieved by said pulley and clamp means and transported from said platform to a position over the water.